3,061,511
Patented Oct. 30, 1962

3,061,511
THIOLPROPIONATE COMPOSITIONS
Henri Albert Dumesnil, Paris, France, assignor to
Frank E. Jonas, New York, N.Y.
No Drawing. Filed Oct. 1, 1958, Ser. No. 764,497
6 Claims. (Cl. 167—53)

This invention relates to new compounds and compositions useful in human and veterinary medicine and containing thiolpropionic acid or certain derivatives thereof, and more particularly to a composition consisting essentially of a synergistic combination of a thiolpropionate, a cobaltithiopropionate, and benzimidazyl 1-(beta-pyridyl carbonamide)-2-propanoic acid in a vehicle or carrier. This application is a continuation in part of my application S.N. 551,520, filed December 7, 1955, now U.S. Patent No. 2,985,557.

The thiolpropionate responds to the formula:

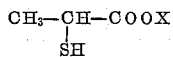

in which X is hydrogen, a salt or ester group such as a monovalent metal, a group $Me_n$ wherein Me is a polyvalent metal and $n$ is a fractional number in which the numerator is 1 and the denominator is equal to the valence of such polyvalent metal, an alcoholic residue particularly an alkyl group, or the cation of an organic base. Thus, the thiolpropionate may be thiolpropionic acid or an alkali or alkaline-earth or other salt of thiolpropionic acid, or an ester thereof such as an alkyl or acyl ester. These thiolpropionates can be readily obtained from the thiolpropionic acid through the action thereon of a suitable compound capable of transferring the radical X. In general, the mineral salts and the alkali and alkaline-earth metal salts of thiolpropionic acid are directly obtained by neutralization of the acid by means of bases of the metals. Heavy metal salts are obtained by the action of thiolpropionic acid on the appropriate metal carbonates, the reactions being carried out according to the theoretical equations. In order to prepare the salts of amines, amino alcohols and the ether-salts of thiolpropionic acid, potassium thiolpropionate is caused to react in strong alcoholic medium, such as 99% methanol, on halides of the radial X to be substituted.

Thiolpropionic acid is a light, syrupy liquid having a density at 15° C. of approximately 1.220 and a boiling point of 117° C. under 15 mm. of mercury. It is soluble in most of the usual solvents and, in particular, in water, methyl alcohol, ethyl alcohol, propyl alcohol and higher alcohols, in acetone, ether, and esters of relatively low molecular weight. The alkaline and alkaline earth salts are soluble in water and methanol as well as ethanol, and to a lesser degree in propanol. They are soluble in acetone but insoluble in the other solvents. The heavy metal thiolpropionates are somewhat soluble in water but practically insoluble in organic solvents.

The reactions of the thiolpropionates depend upon reactions peculiar to the thiolpropionic ion and, besides, on the metallic or organic remainder of the molecule. Thus, they give colored reaction products with nitroprussiate of soda in an ammoniacal medium and decolor iodine solutions by reaction on the sulfur radicals in the form of thiol derivatives.

Typical thiolpropionates according to the invention are those of sodium and calcium.

Sodium thiolpropionate has the formula:

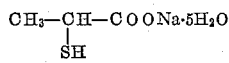

It is a crystalline white powder with 5 molecules of water which it does not lose at 120° C. under vacuum. It is a white product of feeble sulfurous odor when it is pure, having no melting point but beginning to decompose around 250° C. while evolving flammable gases and organically combined sulfur.

Calcium thiolpropionate has the formula:

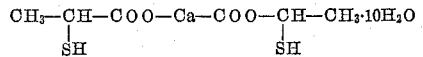

It is in the form of a crystalline powder without a melting point, carbonizing around 270° C. while evolving flammable gases. It crystallizes with 10 molecules of water which it does not lose at 130° C. under vacuum even at 15 mm. of mercury.

The cobaltithiopropionates are new organic cobalt compounds represented by the general formula:

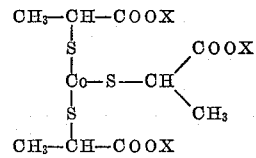

in which the groups X, which can be the same or different, are any of those hereinbefore stated except hydrogen.

The cobaltithiopropionates are prepared by reacting in aqueous medium a thiolpropionate of the formula:

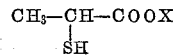

in which X has the meaning first stated above, with cobalt carbonate, cobalt oxide or cobalt hydroxide. The choice of cobalt compound is dictated by the care of not introducing into the reaction medium any acid residue which can cause retrogression of the reaction. The reaction can be carried out at any ambient temperature whatever but it has been found to be advantageous to heat the reaction somewhat, preferably to the reflux temperature of the solvent, in order to accelerate the reaction. The cobaltithiopropionates other than the alkali salts are insoluble in water, and thus can be readily separated from the reaction mixture. For the alkali cobaltithiopropionates, it is advantageous to add to the water serving as reaction medium an organic solvent in which they are not soluble, such as alcohol or acetone.

The new cobaltithiopropionates are crystalline compounds without definite melting point, easily decomposable by strong acids, oxidizing agents and energetic reducing agents and in which the cobalt in the form of a complex can be detected only after destruction of the molecule. The cobaltithiopropionates of sodium and calcium crystallize respectively with 5 and 10 molecules of water. As above indicated, the alkali cobaltithiopropionates are soluble in water, the other derivatives being water-insoluble. The metallic salts are insoluble in concentrated alcohol, contrary to the organic salts.

The benzimidazyl 1-(β-pyridyl carbonamide)-2-propanoic acid is prepared by salifying 2-(ethyl-2-carboxy)-benzimidazole with nicotinic acid amide. The salification is carried out by heat in the presence of a diluent in which the salt has little solubility, preferably at the temperature of reflux of the diluent which may be water, ethanol, acetone and mixtures thereof. The benzimidazyl 1-(β-pyridyl carbonamide)-2-propanoic acid is in the form of white needles melting at 136° C. and soluble in water and ethanol and insoluble in sulfuric ether. It has a strong sweetening power permitting decrease in amount to 1%. It partakes on the one hand of the chemical characteristics of benzimidazyl propanoic acid (precipitation by picric acid) and on the other hand of reactions of nicotinamide.

The synergistic combination of the foregoing substances is employed for therapeutic purposes with any of the usual vehicles employed in pharmaceutical formulations, whether liquid or solid vehicles. A composition responding to the invention may, therefore, be in the form of compressed tablets, the vehicle in that case being a pulverulent excipient such as starch, talc and calcium carbonate. The composition may also be in solution form, in which case the vehicle may be water, with or without the addition of a thickening agent such as glycerine or one of the glycols or an organic solvent, or may be in the form of suspensions in which the vehicle is oily. The various liquid compositions can be utilized as aerosols, as aqueous solutions with or without a thickening agent and as oily suspensions for parenteral injection. Certain of the liquid forms may also be as a drinkable solution for oral administration and the compositions may also take the form of suppositories wherein the vehicle is a conventional excipient of an unctuous character, such as coco butter, or a polyethylene glycol polymer ("Carbowax"). It has been found, however, that the injectable compositions for administration by the intramuscular route are best and are, therefore, preferred, but whatever may be the mode or route or manner of formulation, the daily dose of active ingredients to be administered varies from 50 mg. to 500 mg., which dose can be divided into 2 or 3 parts. Such a dose has been found to be absolutely safe in experiments, particularly with sodium thiolpropionate, on mice and rabbits, giving evidence that the product is not toxic up to dosages of 0.735 gram per kilogram of animal weight. These compositions are particularly useful for treating anemias and have been found to be very satisfactory for such purpose.

It has been found, in accordance with the invention, that a composition containing as its essential active ingredients a combination of one of the specified thiolpropionates, one of the specified cobaltithiopropionates and the benzimidazyl 1-(beta-pyridyl carbonamide)-2-propanoic acid in a suitable vehicle or carrier is therapeutically valuable in the treatment of anemias, particularly primary anemias.

It has been further found that the thiolpropionate may be present in the composition in the range of 10 to 1,000 mg., the cobaltithiopropionate may be present in the range of 1 to 100 mg. and the benzimidazyl 1-(beta-pyridyl carbonamide)-2-propanoic acid may be present in the range of 3 to 300 mg. and that satisfactory compositions may be produced within these ranges.

A particularly satisfactory composition for ampules for injection has the following formulation:

Sodium thiolpropionate _____ mg__ 200
Sodium cobaltithiopropionate _____ mg__ 9.5
Benzimidazyl 1-(beta-pyridyl carbonamide)-2-propanoic acid _____ mg__ 100
Double distilled water _____ ml__ 10

The toxicity of this combination is practically that of the sodium thiolpropionate itself since the other active ingredients have not been found to have any toxic effect in dosages up to 1 gram per kilogram of body weight. Consequently, the compositions according to the invention are atoxic in that they have a therapeutic toxicity coefficient greater than 250.

The following clinical results are illustrative and also demonstrate the synergistic effect of the combination:

To 6 lots of 6 adult rabbits, having an average weight of 2 kg. and all from the same breeding (Tawny Burgundy), hemorrhagic anemia was caused by repeated bleeding of the marginal vein of the ear. Lot #1 received 0.5 ml. of physiological serum. Lots #2, 3, 4, 5 and 6 received the following treatments:

Lot #2—Sodium thiolpropionate (2%) _____ml__ 0.5
Lot #3—Benzimidazyl 1-(beta-pyridyl carbonamide)-2-propanoic acid (1% solution) _____ml__ 0.5
Lot #4—Sodium cobaltithiopropionate (0.1% solution) _____ml__ 0.5
Lot #5—Benzimidazyl 1-(beta-pyridyl carboxy)-2-propanoic acid (1% solution) _____
Lot #6—0.5 ml. of a solution containing:
    Sodium thiolpropionate _____ mg__ 200
    Benzimidazyl 1-(beta-pyridyl carbonamide)-2-propanoic acid _____ mg__ 100
    Sodium cobaltithiopropionate _____ mg__ 9
    Distilled water to make 10 ml.

The following results were obtained (average percent of globular hematocrit deficiency):

| Lots | I | II |
|---|---|---|
| 1 | 20, 27 | 19, 49 |
| 2 | 20, 27 | 26, 82 |
| 3 | 13, 13 | 17, 89 |
| 4 | 23, 25 | 24, 15 |
| 5 | 15, 13 | 20, 25 |
| 6 | 5, 99 | 9, 56 |

These values are averages obtained after 15 days of repeated bleedings. Lot 1 represents the first results after this lapse of time; lot 2, five days later.

From the foregoing table, it will be observed that the globular loss is significantly less with the combination (lot 6). This lessened loss was due to the more intense blood cell regeneration in the treated animals than in the controls and clearly demonstrates the existence of synergism among the three components.

The diseases from which the treated patients suffered can be classified as follows:

Biermer's disease (primary hemopathies)
Toxic anemias (X-rays, chrysotherapy, drug intoxications)
Secondary anemias through hemorrhages
Leucopenia (asthenias)

In general, the results have been as follows: In Biermer's disease, normalization of the condition occurred with disappearance of the characteristic hemopathic conditions, reticulocytosis, and increase of red blood cells and of hemoglobin. In toxic anemias, there was disappearance or amelioration of the leucopenia and the neutropenia and increase of red blood cells and of hemoglobin. In hemorrhagic anemias, the normal blood cell count is more rapidly obtained. In asthenias there is a disappearance of morbid phenomena.

Below are presented illustrative examples of the preparation of the three types of active components above-mentioned:

EXAMPLE 1

*Thiolpropionic Acid*

There is placed in a receptacle provided with a good agitator, a refrigerant under reflux, and an ampule of bromine, 120 grams of sodium sulfide, 150 grams of colloidal sulfur, and 300 ml. of distilled water. This is brought to boiling until the sulfur dissolves.

There is then added with the ampule of bromine to the solution cooled by running water, under continuous agitation, 170 grams of bromopropionic acid dissolved in 350 ml. of water. The agitation is maintained until the reaction is complete, whereupon the solution is acidified and the liberated dithiopropionic acid taken up with ether.

The ether is evaporated and the dithiopropionic acid recovered and placed in a receptacle furnished with an agitator with ⅓ of its volume of sulfuric acid. Then there is added slowly 2½ times its weight of zinc in small increments. After reaction, the reaction mixture is left for 48 hours and then extracted with ether after reacidification. The ethereal liquors are evaporated on a water bath and the residue is fractionally distilled under vacuum. The fraction distilling over between 110 and 125° C. at 15 mm. of mercury is recovered and submitted to redistillation under strong vacuum in a current of hydrogen. The pure product is thus obtained.

EXAMPLE 2

*Sodium Thiolpropionate*

Into a 1-liter beaker, exteriorly cooled by a current of water, there is placed 106 grams of pure (100%) thiolpropionic acid, freshly distilled under vacuum (PE=96°/10 mm.)

dissolved in 300 ml. of distilled water. There is added in small increments, while agitating, 53 grams of pure dry sodium carbonate. When it all has been added, the mixture is placed in a distillation apparatus and distilled under vacuum until the major portion of the water has been removed up to the point where the liquid commences to form a mist at the surface. The material is then transferred to a crystallizer and dried under a bell jar in the presence of sulfuric acid.

EXAMPLE 3

*Ethylthiolpropionate*

Into a flask provided with a good agitator, there is placed 128 grams of sodium thiolpropionate dissolved in its own weight of distilled water. There is then added under vigorous agitation 165 grams of ethyl sulfate in small increments. This is left to digest for 24 hours after the addition has been completed. The next day the solution is diluted with four volumes of distilled water and extracted with ether. The ether is washed with distilled water and the ether then driven off. The residue is ethylthiolpropionate.

Methylthiolpropionate is prepared in the same manner, except that 130 grams of methyl sulfate is used in place of ethyl sulfate.

EXAMPLE 4

*Diethylamine Thiolpropionate*

106 grams of pure thiolpropionic acid is dissolved in 250 ml. of 95% ethanol. With an ampule of bromine, there is introduced in small increments 73 grams of diethylamine dissolved in 250 ml. of 95% ethanol. The reaction is instantaneous and is strongly exothermic. The alcoholic liquors are concentrated under vacuum and left to crystallize.

EXAMPLE 5

*Diethylaminoethyl Thiolpropionate*

128 grams of sodium thiolpropionate is dissolved in 150 ml. of ethanol and to this is added a solution of 136 grams of diethylaminoethyl chloride dissolved in 150 ml. of ethanol. The reaction takes place rapidly and sodium chloride is precipitated and filtered out. The alcoholic solution is concentrated and then evaporated under vacuum. Alternatively, the diethylaminoethyl thiolpropionate can be equally well obtained by extraction with ether to eliminate the last traces of NaCl.

EXAMPLE 6

*Potassium cobaltithiopropionate*

106 grams of thiolpropionic acid dissolved in its own weight of distilled water is neutralized with 20% KOH. The resulting solution is added to an equal volume of 96% ethanol and raised to boiling while adding 20 grams of pure cobalt carbonate, the boiling being continued until complete evolution of $CO_2$ has occurred. This is allowed to cool and the solution is then filtered and the insoluble fraction washed with alcohol and then with ether and dried.

EXAMPLE 7

*Sodium Cobaltithiopropionate*

The procedure of Example 6 is followed except that the KOH is replaced by NaOH. The product obtained crystallizes with 5 molecules of water.

EXAMPLE 8

*Ethyl Cobaltithiopropionate*

100 grams of ethylthiolpropionate, obtained according to Example 3, is dissolved in 250 ml. of 96% ethanol and is then raised to a temperature of about 75° C., while adding slowly 150 grams of hydrated cobalt carbonate. After reaction, the precipitate is removed by filtration, washed with a little alcohol and then with ether to eliminate the last traces of unconverted ethylthiolpropionate.

EXAMPLE 9

*Benzimidazyl 1-(β-Pyridyl Carbonamide)-2-Propanoic Acid*

A suspension of 19 grams of 2-(ethyl-2-carboxy)-benzimidazole and 12 grams of nicotinic acid amide in 100 ml. of 50% ethyl alcohol is prepared and then gently heated while agitating. The solution becomes clear in the neighborhood of the boiling point of the hydro-alcoholic solution and the heating is then continued until the solution becomes uniform. The boiling is maintained for 5 minutes more and the solution then allowed to cool. The white needles are air-dried and washed 3 times with distilled water, twice with 10 ml. of pure ethanol and twice with 10 ml. of sulfuric ether, and then dried.

The 2-(ethyl-2-carboxy)-benzimidazole starting material is prepared as follows: There is treated at the boiling point for 3 hours in 4 N or 5 N hydrochloric acid medium, 10.8 grams (0.1 mol) of ortho-phenylenediamine and 20 grams of pure succinic acid. After cooling, the material is left overnight in an ice chest in order to precipitate excess succinic acid and orthophenylenediamine succinate. The filtrate is air-dried and neutralized by 5 N NaOH to pH 5. Sodium acetate is then added to saturation and the solution left in the ice chest for 24 hours. The 2-(ethyl-2-carboxy)-benzimidazole which has crystallized is air-dried and washed with iced distilled water, and the crude product thus obtained is dissolved in boiling distilled water, decolorized with animal charcoal and filtered while still boiling. The filtrate is maintained at the boiling point and a 1% potassium permanganate solution added. The excess of permanganate and the manganese dioxide which form are eliminated by addition of a few drops of 5% sodium bisulfite. The clear solution obtained is put out to cool in the open air and then placed in the ice chest and the next day the crystals of pure 2-(ethyl-2-carboxy)-benzimidazole thus obtained are air-dried.

The use of benzimidazyl 1-(β-pyridyl carbonamide)-2-propanoic acid has been found to give unexpectedly superior results as compared with my aforesaid application Serial No. 551, 520.

The foregoing is presented as illustrative and not as limitative since, within the terms of the appended claims, various modifications may be made without departing from the invention.

I claim:

1. A composition comprising a vehicle; a thiolpropionate having the fromula

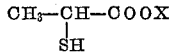

wherein X is selected from the group consisting of hydrogen, and alkali metal, an alkaline earth metal, a lower alkyl group, an acyl group, the diethylamine group and the diethylaminoethyl group; a cobaltithiopropionate having the formula

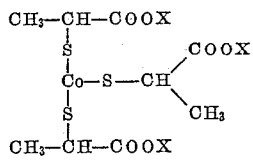

wherein X is selected from the group consisting of an alkali metal, an alkaline earth metal, a lower alkyl group, an acyl group, the diethylamine group and the diethylaminoethyl group; and benzimidazyl 1-(beta-pyridyl carbonamide)-2-propanoic acid.

2. A composition according to claim 1, in which the content of the thiolpropionate ranges from 10 to 1,000 milligrams, the content of the cobaltithiopropionate ranges from 1 to 100 milligrams and the benzimidazyl 1-(beta-pyridylcarbonamide)-2-propanoic acid ranges from 3 to 300 milligrams.

3. A composition according to claim 1, in which the vehicle is liquid.

4. A composition according to claim 1, in which the vehicle is solid.

5. A composition according to claim 1, in which the vehicle is solid and the composition is formed into compressed tablets.

6. A synergistic composition consisting essentially of the following constituents in the following relative amounts:

|  | Milligrams |
|---|---|
| Sodium thiolpropionate | 200 |
| Sodium cobaltithiopropionate | 9 |
| Benzimidazyl 1-(beta-pyridyl carbonamide)-2-propanoic acid | 100 |
| Distilled water to make 10 milliliters. | |

References Cited in the file of this patent

UNITED STATES PATENTS

| 2,496,741 | Compton | Sept. 3, 1946 |
| 2,759,870 | Newmark | Aug. 21, 1956 |
| 2,860,141 | Larrabee | Nov. 11, 1958 |
| 2,882,275 | Meiser | Apr. 14, 1959 |
| 2,947,754 | Scudi | Aug. 2, 1960 |

OTHER REFERENCES

Magistrette: Chem. Abst., vol 50, 1956, page 1021g (citing: Atti Soc. Lombardii Sci. Med. and Biol., vol. 10, pages 619-622. 1955).